(No Model.)

H. J. KESTER.
FODDER BUNDLER.

No. 606,287. Patented June 28, 1898.

WITNESSES
Jas. C. Stock
A. M. Poynton

INVENTOR
Henry J. Kester
By John Hedderbrey
Attorney

UNITED STATES PATENT OFFICE.

HENRY J. KESTER, OF NAPOLEON, OHIO.

FODDER-BUNDLER.

SPECIFICATION forming part of Letters Patent No. 606,287, dated June 28, 1898.

Application filed October 30, 1896. Serial No. 610,571. (No model.)

*To all whom it may concern:*

Be it known that I, HENRY J. KESTER, a citizen of the United States, residing at Napoleon, in the county of Henry and State of Ohio, have invented certain new and useful Improvements in Fodder-Bundlers; and I do hereby declare the following to be a full, clear, and exact description of the invention, such as will enable others skilled in the art to which it appertains to make and use the same.

This invention has reference to a novel construction in a bundling-machine adapted more especially for use in bundling fodder and holding the same while it is being tied.

The invention consists in the features of construction hereinafter fully described and claimed.

Figure 1:
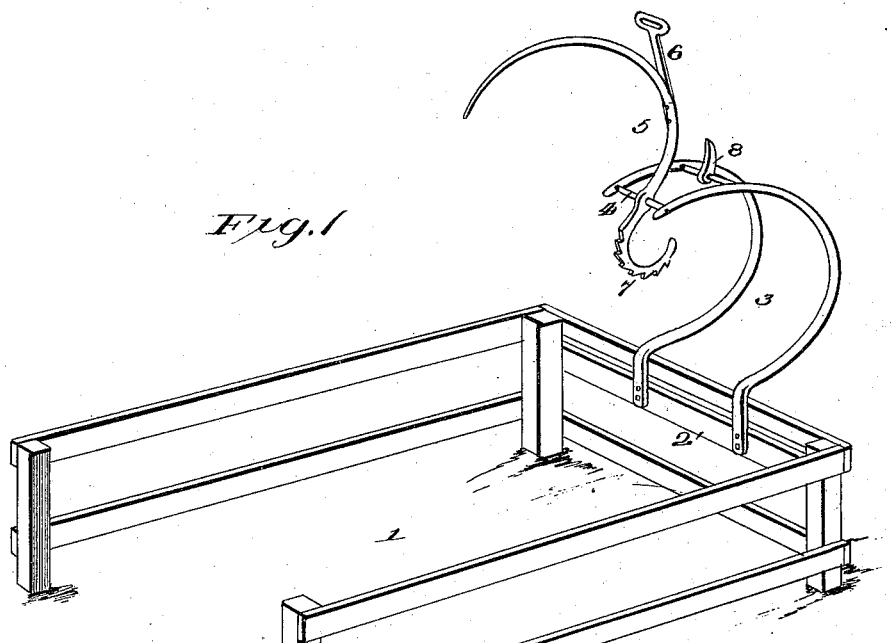
Figure 2:
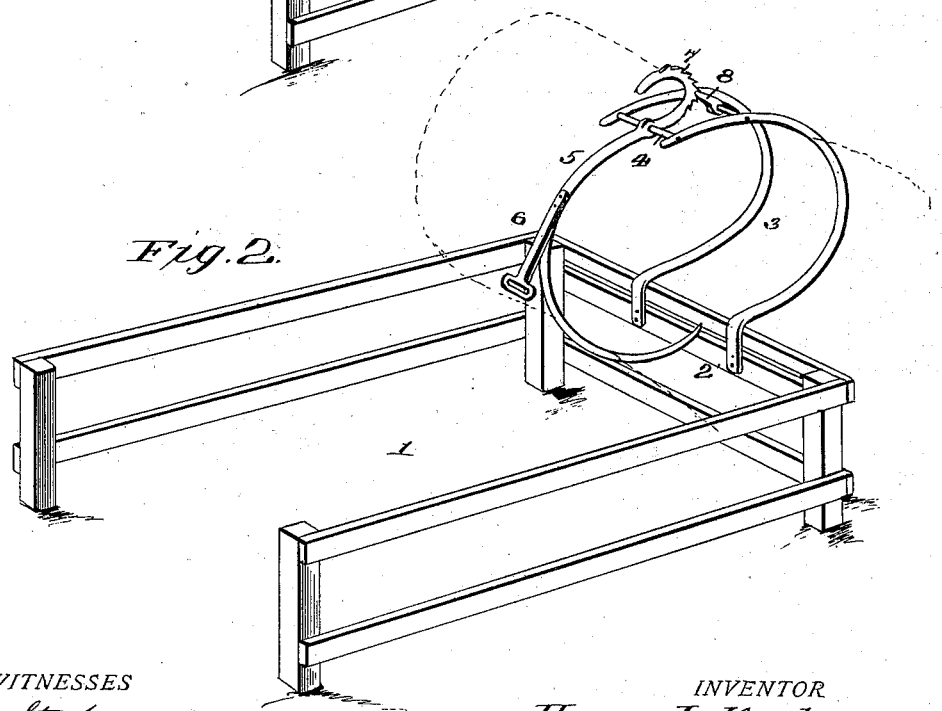

In the accompanying drawings, forming a part of this specification, Figure 1 is a perspective view of a bench with this improvement applied thereto and showing the parts in an open position. Fig. 2 is a similar view showing the parts closed and with a bundle of fodder held thereby, said fodder being shown in dotted lines.

Referring now to said drawings, 1 indicates a bench which is provided at one end with a cross-piece 2, to which this attachment is secured. Two semicircular arms 3 are secured at their lower ends to this cross-piece 2 and are so arranged that the outer ends are situated adjacent to each other. Between the outer end portions of these arms 3 is a pivot 4, upon which is mounted a movable arm 5, which is approximately semicircular and is provided with a handle 6 between its ends. The rear end portion of the arm 5 in the rear of pivot 4 is provided with notches or teeth 7, that are adapted to be engaged by the pawl 8, mounted upon the said arms 3.

The parts being arranged as above described, the operation is as follows: A bundle of fodder is laid upon the bench, the arm is thrown upwardly or in an elevated position, and the fodder is placed below the same. Then the arm 5 is brought down and pressed around the bundle of fodder by the handle 6, after which the pawl 8 is thrown into engagement with the teeth 7 while the tie is being applied. It will therefore be seen that an economical bundler is provided that can be operated quickly.

Having thus described my invention, what I claim as new, and desire to secure by Letters Patent, is—

A bundler comprising two stationary curved arms, a pivot extending between the outer ends of said stationary arms, a pawl mounted upon a cross-piece extending between said stationary arms in the rear of said pivot, a curved swinging arm mounted between its ends upon the pivot extending between said stationary arms, a handle extending from the outside of said swinging arm, and a laterally-curved end portion for said swinging arm provided with a plurality of notches or teeth to receive said pawl, substantially as described.

In testimony whereof I have signed this specification in the presence of two subscribing witnesses.

HENRY J. KESTER.

Witnesses:
 JOHN C. RAGAN,
 GEO. VOGLE.